April 5, 1960 A. E. SNOWDON ET AL 2,931,929
ELECTRIC MOTOR
Filed March 24, 1958 2 Sheets-Sheet 1

INVENTORS
Arthur E. Snowdon
Gustav O. Fredrickson
BY
Johnson and Kline
ATTORNEYS April 5, 1960

A. E. SNOWDON ET AL 2,931,929

ELECTRIC MOTOR

Filed March 24, 1958

INVENTORS
Arthur E. Snowdon
Gustav O. Fredrickson

BY Johnson and Kline

ATTORNEYS

United States Patent Office 2,931,929
Patented Apr. 5, 1960

2,931,929

ELECTRIC MOTOR

Arthur E. Snowdon, Bristol, and Gustav O. Fredrickson, Southington, Conn., assignors to The Superior Electric Co., Bristol, Conn., a corporation of Connecticut Application March 24, 1958, Serial No. 723,284

7 Claims. (Cl. 310—156)

The present invention relates to an electric motor of the synchronous inductor type and more particularly to an improvement in the rotor assembly of such a motor.

The motor of the present invention is of the type disclosed and claimed in the copending application of Gustav O. Fredrickson entitled Electric Motor, Serial No. 632,567, filed January 4, 1957.

The application discloses a motor having a rotor assembly which is permanently magnetized axially by a permanent magnet mounted on the rotating shaft. To provide a paramagnetic path for the flux, there is mounted on the shaft at each end of the magnet in substantially touching relation therewith, an end piece. Encircling the rotor assembly in close proximity thereto is a stator assembly having windings for alternately magnetizing a plurality of paramagnetic polar projections whose inner peripheries are formed with evenly spaced teeth. The outer peripheries of the end caps are also formed with evenly spaced teeth and are separated from the projections by a small air gap, with the magnetic fluxes in the teeth of the stator and rotor assemblies coacting to create the torque of the motor. Each end cap is substantially cylindrical and consists of two pieces, an inner pole piece and secured on the periphery of the pole piece an armature piece. The pole piece is formed of cast steel or iron and is machined while the armature piece is ring-shaped and is formed from stacked laminations of stamped metal machined to close tolerances so that the armature piece can be force-fitted over the periphery of the pole piece. While this construction produces a suitably operating motor, the forming of each end cap by two machined pieces, one of which is laminated, and both held to small tolerances, renders the rotor assembly particularly costly. Moreover the forming of each end cap of two different materials provides an unequal distribution of magnetic flux in the end caps and in the magnetic path which decreases the desired starting and operating characteristics of the motor.

An object of the present invention is to provide in a motor of the above type end pieces for a rotor assembly which are more economical to manufacture and more easily assembled on the motor shaft to form the rotor assembly.

Another object of the present invention is to provide in a rotor assembly of the above type for the forming of the end caps of material which increases and improves the starting torque of the motor and also improves the operating characteristics of the motor.

In carrying out the present invention, the rotor assembly is formed of a shaft having mounted thereon a permanent magnet in the shape of a cylinder with the magnet being polarized axially. Positioned juxtaposed and in substantially touching contact with each end of the magnet are end caps. Each end cap is force-fitted over serrations formed on the shaft to secure the end cap against relative rotation on the shaft and means are provided for preventing axial movement of the end pieces on the shaft. In the specific embodiment shown, this means comprises nuts operating on threaded portions of the shaft for compressing and clamping together the end caps and the magnet.

Each end cap is made in one piece of paramagnetic material and more particularly of 100% electrolytic iron. In order to provide economically and with accuracy the dimensions of the cap including the teeth on the periphery, the cap is first molded of particles of the iron and then sintered. Accordingly the end cap consists only of a single piece of molded sintered paramagnetic material rather than being formed of two machined pieces.

In addition to decreasing the cost of manufacture and of fabrication of the rotor assembly the use of electrolytic iron as the composition of the end cap aids in the operation of the motor particularly when starting the motor. The use of sintered material sets up within the end caps, eddy currents which create an additional starting torque by a squirrel-cage effect which is always in the running direction. The directional starting torque of the motor of the present invention is accordingly greater than in the prior constructions. There is thus less tendency of the motor to reverse itself and start in the wrong direction.

Other features and advantages will hereinafter appear.

Figure 1:
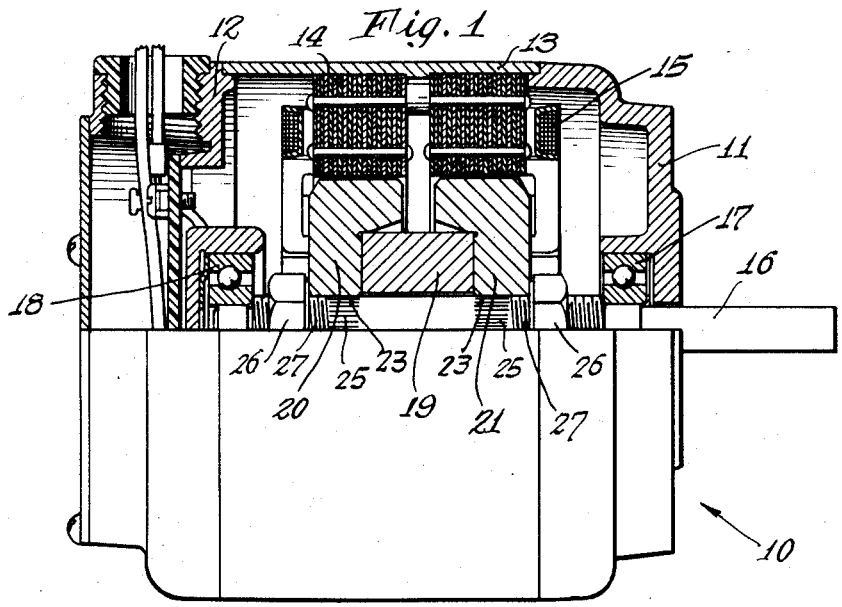
Figure 1 is an elevation of the motor of the present invention with the upper half of the motor shown in section.

Referring to the drawing, the motor of the synchronous induction type of the present invention is generally referred to by the reference numeral 10 and has a casing formed of two end pieces 11 and 12 with a stator shell or ring 13 interconnecting the end pieces. A stator assembly formed of a pair of stacked laminated punchings 14 is secured to the shell and intertwined with the stator stacks are windings 15 for producing an alternating magnetic flux in the punchings 14. The punchings are formed to provide inwardly projecting polar projections 14a whose inner peripheries are formed with teeth located on a segment of a circle.

The rotor assembly is mounted on a shaft 16 operating in a ball bearing 17 secured to the end piece 11 and a ball bearing 18 secured to the end piece 12. The rotor assembly includes a permanent magnet 19 which is cylindrical and is polarized axially so that the poles of the magnet are located at each end face. Mounted on the shaft 16 adjacent each end face of the magnet 19 are end caps 20 and 21. Each end cap is provided with a plurality of evenly spaced teeth 22 which cooperate with evenly spaced teeth on the stator punchings 14 to produce the rotation of the motor. For a more detailed description of the operation and construction of the motor, reference is made to the above-mentioned application of Fredrickson.

Figure 2:
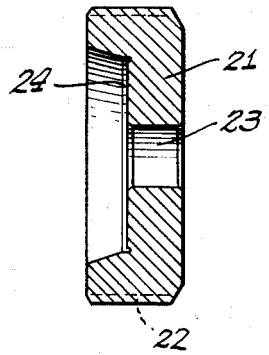
Fig. 2 is a diametric section of an end cap.
Figure 3:
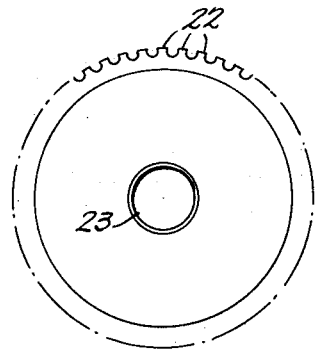
Fig. 3 is a front view of an end cap of the present invention.
Figure 4:
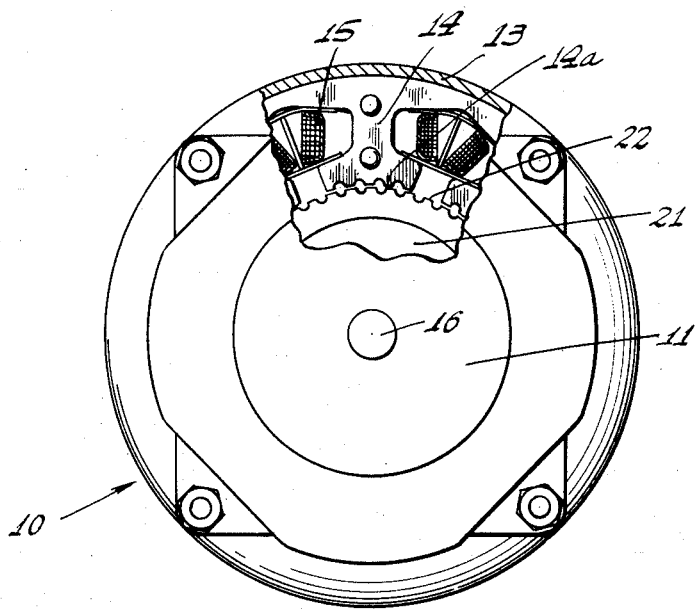
Fig. 4 is an end view of the motor of the present invention with a portion of the casing removed.

In carrying out the present invention, each end cap is formed as shown in Figs. 2 and 3 so that it has a central axial aperture 23 and a recessed rear face 24. Also formed on the periphery are the teeth 22. The shaft on which the end caps are mounted is provided with longitudinal ridges 25 so that the end caps when force-fitted onto the shaft 16 are secured thereto against relative rotational movement by the ridges being forced into the end caps. The end caps are held against longitudinal movement by nuts 26 operating on threaded portions 27 of the shaft and upon tightening of the bolts, the end caps are forced against the permanent magnetic end faces to form a magnetic path from one end face of the magnet, through the adjacent one end cap, through one stack of stator punchings, the shell 13, the other stack of stator punchings and the other end cap to the opposite end face of the magnet.

The end caps 20 and 21 are identical and are formed by molding and sintering 100% electrolytic iron into the desired shape which produces a single unitary piece of soft iron which is paramagnetic. It will be appreciated that this manner of forming the end caps is economical and is capable of producing a piece which may be held within the close tolerances so that it may be easily and economically mounted on the shaft and yet maintain within close limits the small air gap between the inner periphery of the stator stacks and the outer periphery of the end caps. Moreover each tooth 22 is accurately formed and the teeth are accurately spaced about the periphery of the end cap.

When starting, the motor of the present invention acts substantially like an inductor motor. The use of sintered material which is uniform throughout the unitary end cap improves the starting characteristics of the motor over prior motors since the torque is increased by a squirrel-cage effect due to eddy currents created in the end caps which coact with the stator flux to smoothly pull the rotor assembly into synchronism. In addition the use of a one-piece sintered end cap has increased the maximum ability of the motor to run at greater ranges of frequency and voltage.

It will thus be appreciated that applicants, according to the present invention, have improved the starting and operating characteristics of a motor such as disclosed in Fredrickson's above mentioned patent application and at the same time have substantially decreased the cost of manufacture of the motor. This is accomplished according to the present invention by the forming of the end caps as a unitary structure and of making each end cap of molded, sintered 100% electrolytic iron having the desired shape held within close tolerances.

Variations and modifications may be made within the scope of the claims and portions of the improvements may be used without others.

We claim:

1. A rotor assembly for use in a synchronous inductor type motor comprising a shaft, a permanent magnet mounted on the shaft and polarized axially, at least one substantially cylindrical end cap axially mounted on the shaft and having an end face in substantially touching relation with one end face of the magnet, said end cap being of one unitary piece and formed completely of sintered iron with evenly spaced teeth on its periphery, and means securing the magnet and end cap on the shaft.

2. A rotor assembly for use in a synchronous inductor type motor comprising a shaft, a permanent magnet mounted on the shaft and polarized axially, a pair of substantially identical end caps mounted on the shaft with each end cap having an end face in substantially touching contact wtih an end face of the magnet, each of said end caps being of one unitary piece and formed completely of sintered iron with evenly spaced teeth on its periphery, and means clamping the magnet between the end caps and securing the end caps and magnet to the shaft.

3. A rotor assembly for use in a synchronous inductor type motor comprising a shaft, a permanent magnet mounted on the shaft and polarized axially, a pair of substantially identical end caps mounted on the shaft with each end cap having an end face in substantially touching contact with an end face of the magnet, each of said end caps being of one unitary piece and formed completely of sintered iron with evenly spaced teeth on its periphery, said shaft adjacent each end being formed with an inner axially rigid portion and a contiguous threaded portion, each end cap being force-fitted onto each of the ridged portions, and nuts operable on the threaded portion for clamping the end caps against the faces of the magnet.

4. In a dynamoelectric machine of the synchronous inductor type having a stator assembly including a plurality of windings and a plurality of polar projections extending inwardly with teeth formed on the inner periphery of the projections, a rotor assembly comprising a shaft, a cylindrical permanent magnet mounted on the shaft and polarized axially, at least one substantially cylindrical end cap axially mounted on the shaft juxtaposed to an end portion of the magnet, and means securing the magnet and the end cap on the shaft, said end cap being unitary and formed completely of sintered paramagnetic material with evenly spaced teeth on its periphery.

5. In a dynamoelectric machine of the synchronous inductor type having a stator assembly including a plurality of windings and a plurality of polar projections extending inwardly with teeth formed on the inner periphery of the projections, a rotor assembly comprising a shaft, a cylindrical permanent magnet mounted on the shaft and polarized axially, at least one substantially cylindrical end cap axially mounted on the shaft and having one end face juxtaposed to one end face of the magnet, and means securing the magnet and the end cap on the shaft, said end cap being unitary and formed completely of molded, sintered, paramagnetic material with evenly spaced teeth on its periphery.

6. In a dynamoelectric machine of the synchronous inductor type having a stator assembly including a plurality of windings and a plurality of polar projections extending inwardly with teeth formed on the inner periphery of the projections, a rotor assembly comprising a shaft, a cylindrical permanent magnet mounted on the shaft and polarized axially, two substantially cylindrical end caps axially mounted on the shaft, each cap having one end face in substantially touching engagement with an end face of the magnet, and means securing the magnet and the end caps on the shaft, each of said end caps being unitary and formed completely of molded, sintered, paramagnetic material with evenly spaced teeth on its periphery.

7. In a dynamoelectric machine of the synchronous inductor type having a stator assembly including a plurality of windings and a plurality of polar projections extending inwardly with teeth formed on the inner periphery of the projections, a rotor assembly comprising a shaft, a cylindrical permanent magnet mounted on the shaft and polarized axially, two substantially cylindrical end caps axially mounted on the shaft, each cap having one end face in substantially touching engagement with an end face of the magnet, said shaft adjacent each end being formed with an inner axially ridged portion and a contiguous threaded portion, each end cap being force-fitted onto each of the ridged portions, and nuts operable on the threaded portion for clamping the end caps against the faces of the magnet, said end cap being unitary and formed completely of molded, sintered, electrolytic iron with evenly spaced teeth on its periphery.

References Cited in the file of this patent

UNITED STATES PATENTS

| ',335,378 | Bernard | Nov. 30, 1943 |
| 2,433,390 | Packer | Dec. 30, 1947 |
| 2,589,999 | Feiertag | Mar. 18, 1952 |
| 2,721,278 | Baumann et al. | Oct. 18, 1955 |

FOREIGN PATENTS

| 715,165 | Great Britain | Sept. 8, 1954 |
| 757,874 | Germany | Feb. 9, 1953 |
| 916,319 | Germany | Aug. 9, 1954 |